(12) United States Patent
Herlihy

(10) Patent No.: US 6,513,541 B1
(45) Date of Patent: Feb. 4, 2003

(54) VENT VALVE

(76) Inventor: Geoffrey Francis Herlihy, 41 Fifth Avenue, Bicton, Western Australia (AU), 6157

( * ) Notice: Subject to any disclaimer, the term of this patent is extended or adjusted under 35 U.S.C. 154(b) by 0 days.

(21) Appl. No.: 09/587,757

(22) Filed: Jun. 6, 2000

(30) Foreign Application Priority Data

Jun. 17, 1999 (AU) .............................................. PQ0991

(51) Int. Cl.$^7$ .......................... F16K 11/10; F16K 31/14; F16K 31/34
(52) U.S. Cl. ...................... 137/202; 137/410; 137/413; 137/430; 137/630; 251/14
(58) Field of Search .................................. 137/192, 202, 137/430, 433, 630.13, 630.14, 630.15, 410, 411, 448, 413, 630; 251/14

(56) References Cited

U.S. PATENT DOCUMENTS

| | | | |
|---|---|---|---|
| 1,119,979 A | * 12/1914 | Mulligan | 137/202 |
| 1,119,980 A | * 12/1914 | Mulligan | 137/202 |
| 2,179,750 A | * 11/1939 | McCracken | 137/202 |
| 2,673,618 A | * 3/1954 | Batchelder | 137/202 |
| 2,677,387 A | * 5/1954 | Crawford | 137/202 |
| 2,784,740 A | 3/1957 | Stageberg | |
| 2,812,772 A | * 11/1957 | Moore | 137/202 |
| 2,849,016 A | * 8/1958 | Nations | 137/202 |
| 3,021,861 A | 2/1962 | Billeter et al. | |
| 3,054,419 A | * 9/1962 | Farrell | 137/202 |
| 3,282,288 A | 11/1966 | Sheppard | |
| 3,334,645 A | * 8/1967 | Weinstein | 137/202 |

(List continued on next page.)

FOREIGN PATENT DOCUMENTS

| | | |
|---|---|---|
| AU | R3628978 | 5/1978 |
| AU | 333384 | 9/1984 |

(List continued on next page.)

*Primary Examiner*—George L. Walton
(74) *Attorney, Agent, or Firm*—Gottlieb, Rackman & Reisman, P.C.

(57) ABSTRACT

A pipeline vent valve comprising a body (13) defining a chamber (A) having an inlet (17) towards its lower end which is adapted to be connected to a pipeline and an outlet (21) towards its upper end, the outlet defined by a valve seat, a first valve member (23) supported in the chamber to be moveable between a first position at which it is in sealing engagement with the valve seat and a second position at which it is out of engagement with the valve seat, the first valve member in its movement to the first position being responsive to the magnitude of the gaseous flow rate through the valve seat to be moveable to the first position on the gaseous flow rate exceeding a desired level, the first valve member also being responsive to the level of liquid in the chamber and being adapted to close when the liquid level in the chamber exceeds a predetermined level, the first valve member having in opening providing communication to each side of the first valve member, a second valve member fixed to the first valve member to be moveable between a first position at which it is in sealing engagement with the entry of the opening and a second position at which it is out of engagement with the entry of the opening, the float member supported within the chamber and fixed to the second valve member to cause movement of the second valve member between the first and second position as a result of movement within the valve member resulting from the presence of liquid in the chamber.

15 Claims, 4 Drawing Sheets

U.S. PATENT DOCUMENTS

| | | | | |
|---|---|---|---|---|
| 3,340,887 A | * | 9/1967 | Peters | 137/202 |
| 3,593,740 A | * | 7/1971 | Harrison | 137/630.14 |
| 3,726,303 A | * | 4/1973 | Allen et al. | 137/202 |
| 3,726,313 A | | 4/1973 | Pandya | |
| 3,741,234 A | | 6/1973 | Siebold | |
| 3,776,255 A | * | 12/1973 | Fujiwara | 137/202 |
| 3,796,227 A | * | 3/1974 | Fujiwara | 137/202 |
| 3,951,168 A | | 4/1976 | Roberts | |
| 3,973,582 A | | 8/1976 | Siebold | |
| 4,082,106 A | | 4/1978 | Butcher | |
| 4,084,617 A | | 4/1978 | Happe | |
| 4,230,142 A | * | 10/1980 | Saarem et al. | 137/202 |
| 4,342,328 A | * | 8/1982 | Matta | 137/630.15 |
| 4,484,728 A | | 11/1984 | Moore | |
| 4,586,528 A | * | 5/1986 | Andres et al. | 137/202 |
| 4,770,201 A | * | 9/1988 | Zakai | 137/202 |
| 4,982,757 A | * | 1/1991 | Ohasi et al. | 137/202 |
| 5,090,439 A | | 2/1992 | Sabalvaro, III et al. | |
| 5,386,844 A | * | 2/1995 | Kennedy | 137/202 |
| 5,439,023 A | * | 8/1995 | Horikawa | 137/202 |
| 5,511,577 A | | 4/1996 | Richards et al. | |
| 5,605,175 A | * | 2/1997 | Bergsma et al. | 137/202 |
| 5,660,533 A | * | 8/1997 | Cartwright | 137/202 |

FOREIGN PATENT DOCUMENTS

| | | |
|---|---|---|
| AU | 540620 | 9/1984 |
| AU | B7620087 | 4/1988 |
| AU | B7753594 | 10/1994 |
| JP | 8042730 | 2/1996 |
| JP | 9324867 | 12/1997 |
| WO | 9206728 | 4/1992 |
| WO | 9706973 | 2/1997 |

* cited by examiner

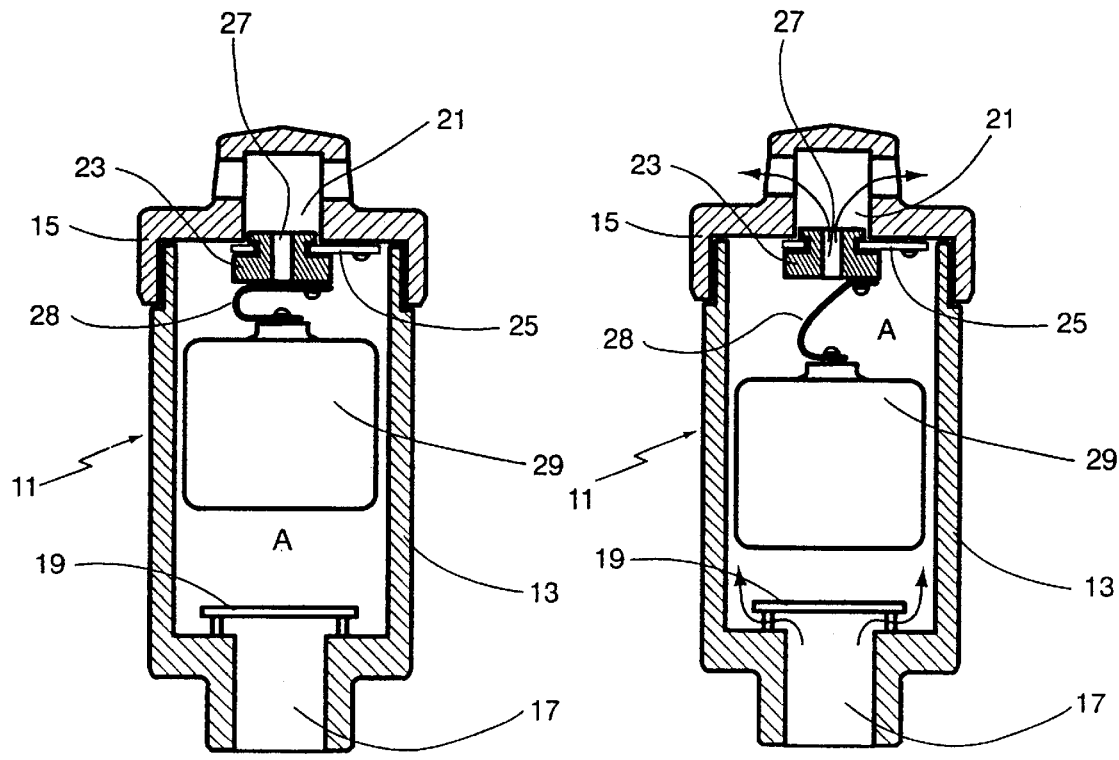
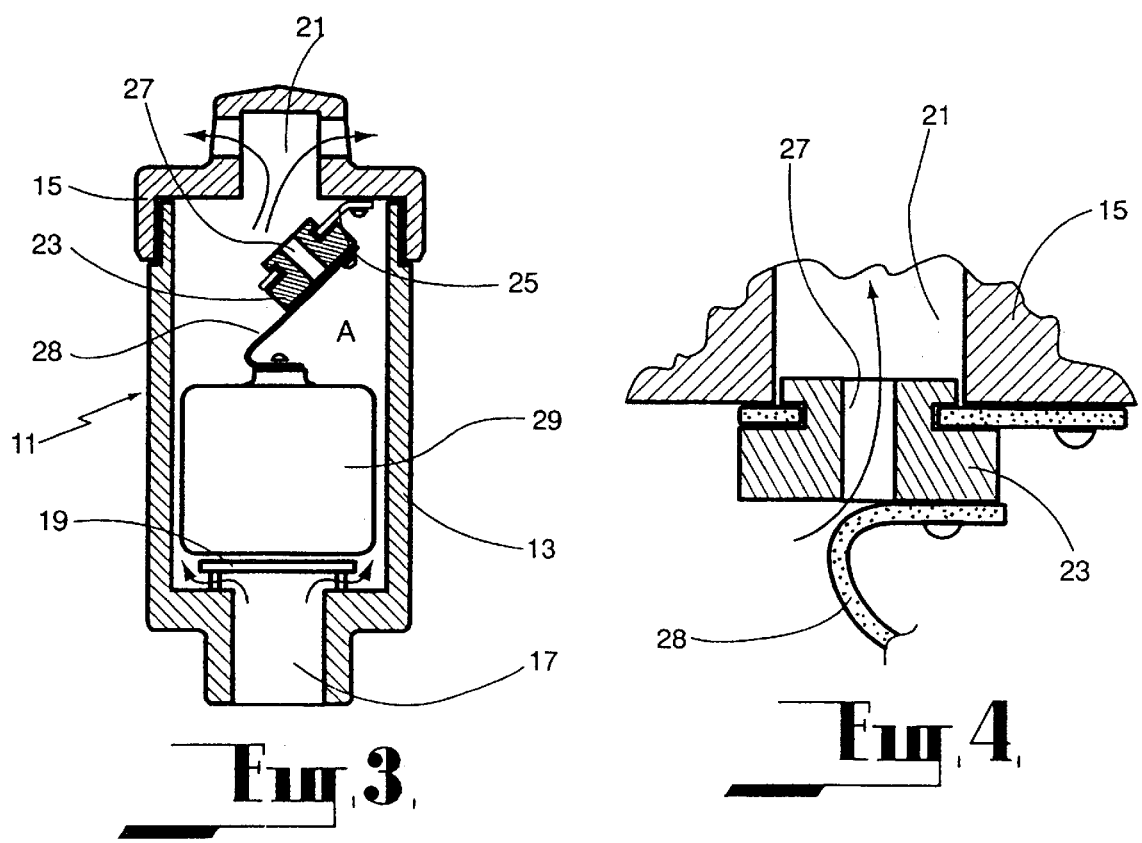

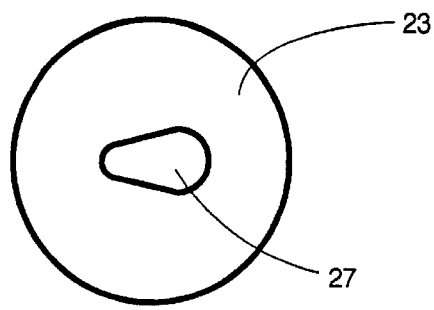
Fig 5
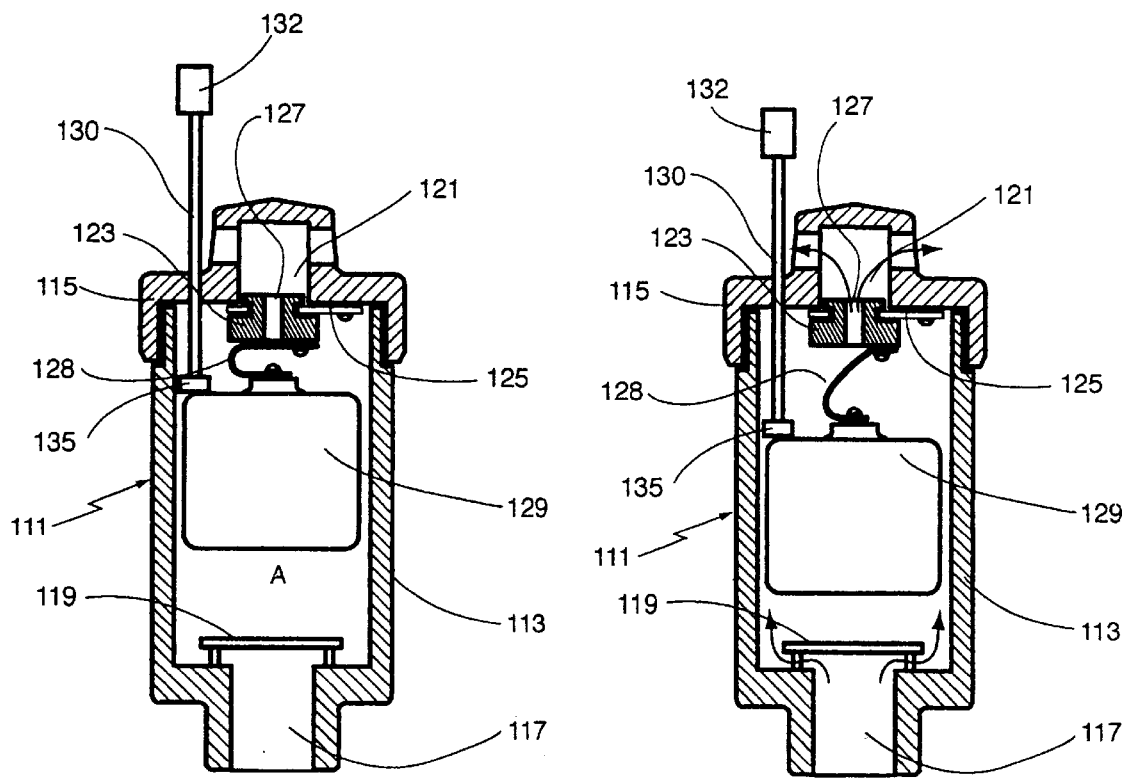
Fig 6  Fig 7

VENT VALVE

FIELD OF THE INVENTION

This invention relates to vent valves which are utilised in pipelines for releasing of air and other gases from the pipeline in order to prevent the formation of air pockets at high points along a pipeline which would otherwise restrict the flow of water through the pipeline. In particular the invention relates to those valves which are known as combined air release valves which are designed to vent or admit large quantities of air whilst the pipeline is being filled and emptied and to continuously release small amounts of air which accumulate in the pipeline in use.

BACKGROUND ART

Several types of air release valves are known. The first type commonly termed an automatic air release valve releases air which is accumulated under pressure in a pipeline during normal operating conditions. In this type of valve a float member is located within a housing which is mounted at its lower end to a pipeline which is to be vented by the valve member. The housing is provided at its upper end with venting aperture. During normal operation with the flow of water through the pipeline, water enters the housing which bouys the float member upwardly against the outlet aperture to seal the outlet aperture. However, when air migrates into the housing from the pipeline water is displaced out of the housing causing the float member to be displaced downwardly by gravity thereby opening the outlet aperture and allowing the air to vent. In this type of valve the dimensions of the venting aperture are small as the mass of the float must be greater than the force created by the working pressure which is operating on the orifice area.

A second type of vent valve commonly called combined air release valves employ a second substantially larger float member and a second substantially larger venting orifice in addition to the automatic float member and venting orifice in one common housing. Examples of this form of valve are disclosed in AU-B-68847. This type of valve allows large quantities of air to be vented from or admitted to the pipeline during filling or draining of the pipeline and also permit the continuous release of air under pressurised conditions. Some combined air release valves, commonly termed dynamic valves, are constructed such that the larger float member is lifted by the pressure differential caused by out rushing of air thereby closing the larger orifice in order to reduce the velocity of the air flow from the pipeline and thus the velocity of water flow into the valve. An example of such a device is disclosed in U.S. Pat. No. 5,511,577 and is marketed under the trade mark VENT-O-MAT. Other combined air release valves, commonly termed kinetic valves, are constructed such that the larger float member is unaffected by the out rushing air and only closes when buoyed by the entry of water into the housing. A form of this form of valve is disclosed in AU-B-76200/87 which is marketed under the trade mark BARAK. In both forms of construction the larger float member remains in sealing engagement with the venting orifice whilst the valve is pressurised and will only reopen once pressure in the housing has dropped to atmospheric pressure, and as a result the air may only be vented through the small orifice during the pressurised operation.

A disadvantage of vent valves of the form described above is that due to the small dimensions of the small orifice, buoyant foreign matter present in the water can block the orifice causing the valve to leak. In addition a disadvantage of the dynamic type of valve is that the large orifice closes before completion of the venting and residual air in the pipeline may be swept past the valve due to the inability of the small orifice to cope with the volume of air to be vented resulting in the formation of air pockets along the pipeline which will restrict the flow of water in the pipeline. A disadvantage of the kinetic type of valve is that the valve closes suddenly causing adverse pressure changes to occur in the pipeline as a result of such closure which can often result in damage to the pipeline.

DISCLOSURE OF THE INVENTION

Accordingly, the invention resides in a pipeline vent valve comprising a body defining a chamber having an inlet towards its lower end which is adapted to be connected to a pipeline and an outlet towards its upper end, the outlet defined by a valve seat, a first valve member supported in the chamber to be moveable between a first position at which it is in sealing engagement with the valve seat and a second position at which it is out of engagement with the valve seat, said first valve member in its movement to the first position being responsive to the magnitude of the gaseous flow rate through the valve seat to be moveable to the first position on the gaseous flow rate exceeding a desired level, said first valve member also being responsive to the level of liquid in the chamber and being adapted to close when the liquid level in the chamber exceeding a predetermined level, said first valve member having an opening providing communication to each side of the first valve member, a second valve member fixed to the first valve member to be moveable between a first position at which it is in sealing engagement with the entry of said opening and a second position at which it is out of engagement with the entry of said opening, a float member supported within the chamber and fixed to said second valve member to cause movement of the second valve member between the first and second position as a result of movement of the valve member resulting from the presence of liquid in the chamber.

According to a preferred feature of the invention said second valve member in its movement from the second to first position will variably engage the entry whereby the degree of closure of the entry will increase as the valve member approaches the first position.

According to one embodiment of the invention the opening has a divergent cross section and the second valve member comprises a flexible membrane fixed at one end adjacent to the most divergent portion of the opening whereby on the movement of the second valve member to the first position the second valve member increasingly engages the entry of the opening from the most divergent portion of the opening to the most convergent.

According to a further preferred feature of the invention the first valve member is hingedly supported from the body at a position adjacent to the valve seat, said hinge resiliently biasing the first valve member to the first position.

According to a alternative preferred feature of the invention the first valve member comprises a buoyant member located within the chamber.

According to a further preferred feature of the invention the body accommodates a bearing member having a portion located exterior of the body and a second portion located within the chamber, said second portion being engageable with the float member whereby on manipulation of the first portion the float member can be moved within the chamber to cause the second valve member to move from its first position.

The invention will be more fully understood in the light of the following description of several specific embodiments.

BRIEF DESCRIPTION OF THE DRAWINGS

The description is made with reference to the accompanying of which:

FIG. 1 is a schematic sectional elevation of a vent valve according to the first embodiment in the closed position:

FIG. 2 is a schematic sectional elevation of the vent valve of FIG. 1 showing the valve in a partially closed condition:

FIG. 3 is a schematic sectional elevation of the vent valve in the fully open condition:

FIG. 4 is an enlarged cross section of the first valve member when the vent valve is in the partially open condition:

FIG. 5 is a sectional view along line 5—5 of FIG. 4:

FIG. 6 is a schematic sectional elevation of a second embodiment of the invention in a fully closed condition:

FIG. 7 is a schematic sectional elevation of the second embodiment in the partially open condition caused by activation of the purging means:

DETAILED DESCRIPTION OF SPECIFIC EMBODIMENTS

Figure 8:
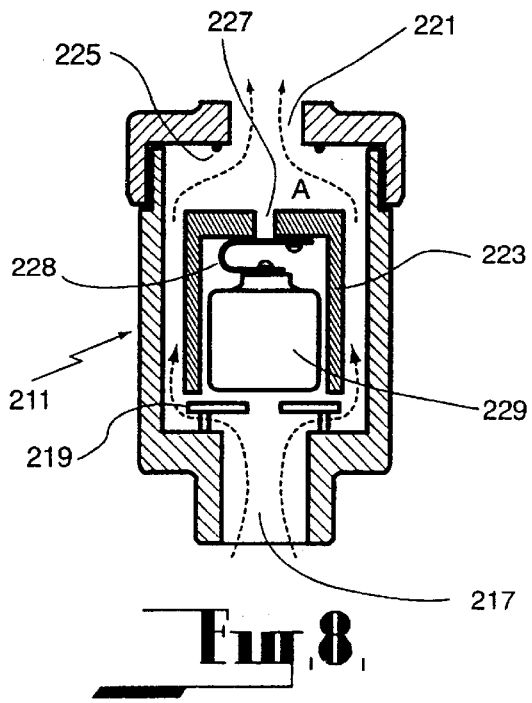
FIG. 8 is a schematic sectional elevation of the third embodiment in the open condition.

Each of the embodiments are directed to the vent valve which is to be utilised in a pipeline which will facilitate venting of air from pipeline during the filling of the pipeline, the delivery of air into the pipeline during the exhaustion of water from the pipeline and the venting of air as it accumulates in the pipeline during use.

The first embodiment as shown at FIGS. 1 to 5 comprises a body defining a chamber (A) defined by a substantially cylindrical first portion which is closed at its upper end by a closure housing (15). The lower end of the cylindrical housing (13) is provided with an inlet (17) which is adapted to be connected to a pipeline and which permits free communication between the pipeline and the chamber (A). A baffle (19) is located in the chamber immediately opposite the inlet (17). The baffle (19) serves the function of directing the fluid flow into the chamber such that such fluid flow will not directly influence the movement of the float (29) which is slidably supported within the chamber and which will be discussed in further detail later. The upper closure member (15) is provided with a central aperture (21) which provides communication between the atmosphere and the interior of the chamber (A) and which is provided with a valve seat which is associated with a first valve member (23). The first valve member (23) is supported from the housing (15) through a hinge member (25) which comprises a flexible strap, fixed to the internal wall of the chamber and supporting the valve member to enable movement of the first member (23) between a first position as shown in FIGS. 1, 2 and 4 at which it is in sealing engagement with the valve seat and a second position as shown at FIG. 3 at which the first valve member is out of sealing communication with the valve seat.

The first valve member (23) is formed with a central passage (27) which extends between the opposed faces of the first valve member to enable air flow from the chamber to the atmosphere. As shown at FIG. 5 the passageway has a cross section whereby it is divergent from one side such that it has a substantially "tear drop" configuration. The first valve member (23) is associated with a second valve member (28) which comprises a flexible membrane fixed at one end to the inner face of the first valve member adjacent the most divergent portion of the opening (27). The other end of the membrane is fixed to a float member (29) which is slidably received within the chamber (A). The second valve member (28) is moveable between a first position as shown at FIG. 1 at which it fully sealingly engages the opening (27) to a fully open position a shown at FIG. 2 at which it is clear of the opening. In its movement between the second and first position the second valve member will gradually engage the opening (27) from its most divergent portion to its most convergent portion such that the opening is gradually closed as the second valve member moves towards its closed position.

The geometry of the first valve member and its support from the interior of the housing through the hinge (25) is such that the first valve member is responsive to the pressure differential created to either side of the first valve member as a result of the air flow through the venting aperture (21) from the chamber (A). As that pressure differential increases the first valve member (23) will be caused to move to its first position at which it sealing engages the valve seat. However, when at that position air flow from the chamber (A) is still permitted through the opening (27) until such time as water enters the chamber (A) to cause the float member (29) to be moved upwardly within the chamber (A) whereby such upward movement results in the gradual closure of the opening (27) by the second valve member (28) until the opening is fully closed and the second valve member (28) moves to its fully closed position. When at this position the vent valve is fully closed. As stated previously the baffle (19) which is associated with the inlet (17) ensures that the float (29) is not directly influenced by the fluid flow into the chamber.

In the event of air entering the chamber (A) during the operation of the pipeline, the entry of such air will cause the float (29) to lower in the chamber (A) resulting in the opening of the second valve member against the pressurised condition within the chamber (A) and to allow for the venting of such additional from the chamber (A).

The second embodiment as shown at FIGS. 6 and 7 is of similar form to that of the first embodiment and differs from the first embodiment by use of a purging rod (130) which is slidably and sealingly received by the upper closure member of the housing to have a handle portion (132) which is located exterior of the housing and an inner portion (135) which is located within the chamber and which bears upon the float member (129). The purging member facilitates the selective opening of the opening (127) in the first valve member (123) through the movement of the second valve member (128). This can be required when the opening (127) becomes blocked due to the presence of foreign matter in the valve member in the opening or when foreign matter collects between the opening and the valve member. With depression of the purging member the float (129) is moved downwardly to cause the second valve member (128) to move clear of the opening.

Figure 9:
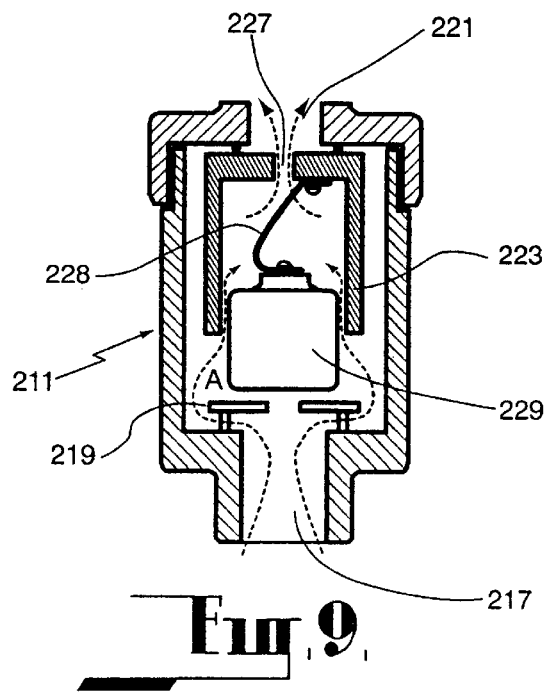
FIG. 9 is a schematic sectional elevation of the third embodiment in the partially closed condition.
Figure 10:
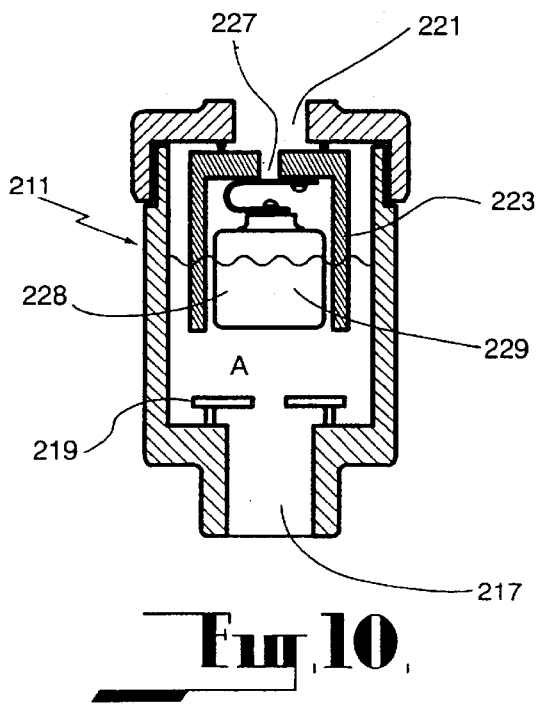
FIG. 10 is a schematic sectional elevation of third embodiment in the fully closed condition.
Figure 11:
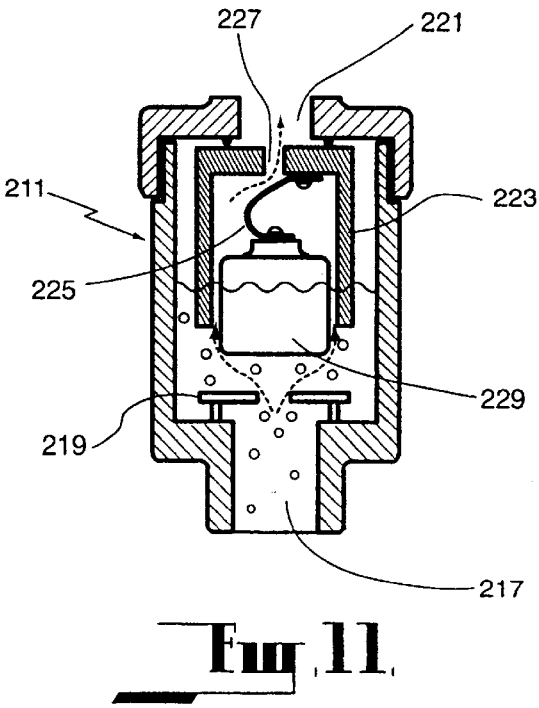
FIG. 11 is a schematic sectional elevation of the third embodiment in the venting condition.

The third embodiment as shown at FIGS. 8, 9, 10, and 11 is of a generally similar form to that of the first embodiment with the exception that the first valve member (223) is formed as a float and is configured such that it is responsive to the pressure differential created within the chamber (A) as a result of the airflow through the chamber (A), such that when the chamber (A) is empty of any water an excessive air flow through the chamber (A) will cause the first valve member (223) to move from its open position as shown at FIG. 8 to a closed position as shown at FIG. 9. On the entry of water into the chamber (A) the first valve (223) member will be retained in its first position as a result of the pressure differential to each side of the first valve member (223) which need only be small to retain the first valve member (223) in the closed position due to the large dimension of the venting aperture (221). However, on the water level dropping within the chamber (A) as a result of air entering the chamber (A) the pressure differential created on the float member (229) is such that the first valve member (223) is retained in its first position whilst the second valve member (228) will be permitted to be caused to be opened to effect venting of the chamber A as shown at FIG. 11. In the case of the second embodiment the second valve member (228) takes a similar form to that of the first embodiment and is fixed to the first valve member (223) in a similar manner and to the float (229) in a similar manner to operate in a similar form to that of the first embodiment.

Figure 12:
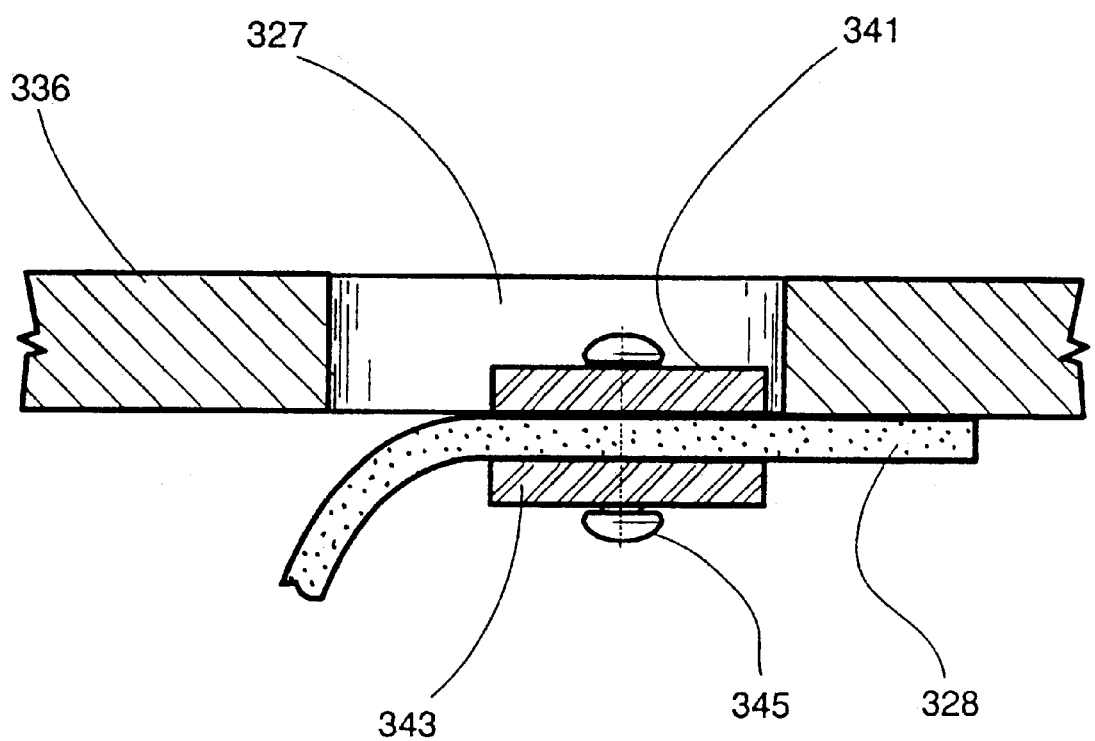
FIG. 12 is a schematic sectional elevation of the mounting of the second valve member to the first valve member according a fourth embodiment.

The fourth embodiment as shown at FIG. 12 relates to a variation of each of the previous embodiments in which reinforcement which is provided on the second valve member (328) in the region of its engagement with the opening. Where the pressure differential which is to be experienced between the opposed faces of the second valve member (328) is excessive and/or the most divergent portion of the opening (327) is large it may become necessary to reinforce the second valve member in the region of the most divergent portion of the opening. Such reinforcing comprises a first metal plate (341) which is receivable on the face of the second valve member (328) which will engage the opening (327). The first plate member (341) has dimensions such that it will be received within the opening (327) on closure of the second valve member (328). In addition the reinforcement comprises a second plate member (343) which is mounted to the second valve member in opposed relation to the first plate member (341). A suitable fixing such as a rivet or like means (345) extends between the first and second plate members (341) and (343).

Throughout the specification, unless the context requires otherwise, the word "comprise" or variations such as "comprises" or "comprising", will be understood to imply the inclusion of a stated integer or group of integers but not the exclusion of any other integer or group of integers.

It should be appreciated that the scope of the present invention need not be limited to the particular scope of the embodiments described above.

What is claimed is:

1. A pipeline vent valve comprising a body defining a chamber having an inlet towards its lower end which is adapted to be connected to a pipeline and an outlet towards its upper end, the outlet defined by a valve seat, a first valve member supported in the chamber to be moveable between a first position at which it is in sealing engagement with the valve seat and a second position at which it is out of engagement with the valve seat, said first valve member in its movement to the first position being responsive to the magnitude of the gaseous flow rate through the valve seat to be moveable to the first position on the gaseous flow rate exceeding a desired level, said first valve member also being responsive to the level of liquid in the chamber and being adapted to close when the liquid level in the chamber exceeds a predetermined level, said first valve member having an opening providing communication to each side of the first valve member, wherein the opening has a divergent cross-section which is substantially constant throughout its extent between each side of the first valve member, a second valve member fixed to the first valve member to depend from the first member and to be moveable between a first position at which it is in sealing engagement with the entry of said opening and a second position at which it is out of engagement with the entry of said opening, and wherein the second valve member comprises a flexible membrane having a first portion adjacent to the most divergent portion of the opening, a float member fixed to the flexible membrane at a second portion spaced from the first portion, said valve member being adapted to flex, whereby on movement of the second valve member from the second position to the first position the second valve member increasingly engages across the entry of the opening from the most divergent portion of the opening to the most convergent and on movement of the second valve member from the first position to the second position the second valve member decreasingly engages across the entry of the opening from the most convergent portion of the opening to the most divergent portion, the float member supported within the chamber and fixed to said second valve member to cause movement of the second valve member between the first and second position as a result of movement of the float member resulting from the presence of liquid in the chamber, wherein movement of the first valve is in response to the absence of liquid within the chamber which is independent of movement of the float member.

2. A pipeline vent valve as claimed at claim 1 wherein the first valve member is hingedly supported from the body at a position adjacent to the valve seat by a hinged connection, said hinged connection applying a biasing force to bias the first valve member to the first position.

3. A pipeline vent valve as claimed at claim 2, wherein the hinged connection comprises a laminar member formed of a resiliently flexible material which is fixed to the body at said position adjacent to the valve seat and which supports the first valve member in spaced relation from said position.

4. A pipeline vent valve as claimed at claim 1 wherein the first valve member comprises a buoyant member located within the chamber.

5. A pipeline vent valve as claimed at claim 1 wherein the body accommodates a bearing member having a portion located exterior of the body and a second portion located within the chamber, said second portion being engageable with the float member whereby on manipulation of the first portion the float member can be moved within the chamber to cause the second valve member to move from its first position.

6. A vent valve as claimed as claim 1, wherein the float member causes the movement of the first valve member in response to the level of liquid in the chamber.

7. A pipeline vent valve comprising a body defining a chamber having an inlet towards its lower end which is adapted to be connected to a pipeline and an outlet towards its upper end, the outlet defined by a valve seat, a first valve member supported in the chamber to be moveable between a first position at which it is in sealing engagement with the valve seat and a second position at which it is out of engagement with the valve seat, said first valve member in its movement to the first position being responsive to the magnitude of the gaseous flow rate through the valve seat to be moveable to the first position on the gaseous flow rate exceeding a desired level, said first valve member also being responsive to the level of liquid in the chamber and being adapted to close when the liquid level in the chamber exceeds a predetermined level, said first valve member having an opening providing communication to each side of the first valve member, a second valve member fixed to the first valve member to depend from the first member and to be moveable between a first position at which it is in sealing engagement with and across the entry of said opening, a float member supported within the chamber and fixed to said second valve member to cause movement of the second valve member between the first and second position as a result of movement of the valve member resulting from the presence of liquid in the chamber, wherein movement of the first valve is in response to the absence of liquid within the chamber which is independent of movement of the float member;

wherein the second valve member in its movement from the second to the first position will variably engage across the entry to at least partially close the entry, between a fully opened position when the second valve member is at the second position and a fully closed position when the second valve member is at the first position and the degree of closure increases as the second valve member approaches the first position.

8. A pipeline vent valve as claimed at claim 7 wherein the opening has a divergent cross-section which is substantially constant throughout its extent between each side of the first valve member, and the second valve member comprises a flexible membrane having a portion fixed at one end adjacent to the most divergent portion of the opening, the float member fixed to the flexible membrane at a second portion spaced from the first portion, said valve member being adapted to flex, whereby on movement of the second valve member from the second position to the first position the second valve member increasingly engages across the entry of the opening from the most divergent portion of the opening to the most convergent, and on movement of the second valve member from the first position to the second position the second valve member decreasingly engages across the entry of the opening from the most convergent portion of the opening to the most divergent portion.

9. A pipe line vent valve as claimed at claim 8, wherein the first valve member comprises a buoyant member located within the chamber.

10. A pipeline vent valve as claimed in claim 7 wherein the first valve member is hingedly supported from the body at a position adjacent to the valve seat by a hinged connection, said hinged connection applying a biasing force to bias the first valve member to the first position.

11. A pipeline vent valve as claimed in claim 8 wherein the first valve member is hingedly supported from the body at a position adjacent to the valve seat by a hinged connection, said hinged connection applying a biasing force to bias the fist valve member to the first position.

12. A pipeline vent valve as claimed at claim 10, wherein the hinged connection comprises a laminar member formed of a resiliently flexible material which is fixed to the body at said position adjacent to the valve seat and which supports the first valve member in spaced relation from said position.

13. A pipeline vent valve as claimed at claim 11, wherein the hinged connection comprises a laminar member formed of a resiliently flexible material which is fixed to the body at said position adjacent to the valve seat and which supports the first valve member in space relation from said position.

14. A vent valve as claimed at claim 7, wherein the float member causes the movement of the first valve member in response to the level of liquid in the chamber.

15. A pipe line vent valve as claimed at claim 7, wherein the first valve member comprises a buoyant member located within the chamber.

* * * * *